US007723703B2

(12) United States Patent
Yamauchi et al.

(10) Patent No.: US 7,723,703 B2
(45) Date of Patent: May 25, 2010

(54) MULTIDIRECTIONAL ELECTROMAGNETIC WAVE IRRADIATION SYSTEM OF WORKPIECE AND LASER MATERIAL PROCESSING SYSTEM EMPLOYING IT

(75) Inventors: Kazuhide Yamauchi, Hirosaki (JP); Kiyoshi Toyamori, Inakadate-mura (JP); Takayoshi Shino, Toyohashi (JP); Toru Kato, Toyohashi (JP)

(73) Assignee: Technical Co., Ltd., Aomori (JP)

( * ) Notice: Subject to any disclaimer, the term of this patent is extended or adjusted under 35 U.S.C. 154(b) by 397 days.

(21) Appl. No.: 11/885,174

(22) PCT Filed: Feb. 28, 2005

(86) PCT No.: PCT/JP2005/003275

§ 371 (c)(1),
(2), (4) Date: Dec. 12, 2007

(87) PCT Pub. No.: WO2006/092827

PCT Pub. Date: Sep. 8, 2006

(65) Prior Publication Data

US 2008/0191150 A1    Aug. 14, 2008

(51) Int. Cl.
*A61N 5/00* (2006.01)

(52) U.S. Cl. .................. 250/492.1; 250/453.11; 250/454.11; 250/455.11; 219/121.11; 219/121.6; 219/121.67; 219/121.68; 359/831; 359/832; 359/833; 359/834; 359/837

(58) Field of Classification Search ............ 250/492.1, 250/453.11, 454.11, 455.11; 219/121.11, 219/121.6, 121.67, 121.68; 359/831, 832, 359/833, 834, 835, 836, 837
See application file for complete search history.

(56) References Cited

U.S. PATENT DOCUMENTS 5,113,279 A * 5/1992 Hanamoto et al. ....... 359/196.1
6,737,605 B1   5/2004 Kern (Continued)

FOREIGN PATENT DOCUMENTS

JP       59-218293       12/1984

(Continued)

OTHER PUBLICATIONS

International Search Report for International Application No. PCT/JP2005/003275.

*Primary Examiner*—Jack I Berman
*Assistant Examiner*—Hanway Chang
(74) *Attorney, Agent, or Firm*—Fay Sharpe LLP

(57) ABSTRACT

A system for multidirectional electromagnetic wave irradiation of an object to be processed has at least one of a side face irradiation prism system capable of irradiating a top face and one, two or more side faces of the object, and a bottom face irradiation prism system capable of irradiating a bottom face of the object. The side face irradiation prism system has an optical path direction changing prism placed so that each of the optical paths through which electromagnetic waves entering the optical path from above travel extends via the optical path direction changing prism to reach the side face of the object, without being obstructed. In this way, a laser machining apparatus or the like can be implemented which can simultaneously irradiate the faces of the object to be processed with electromagnetic waves with accuracy without moving the object to be processed.

17 Claims, 3 Drawing Sheets

U.S. PATENT DOCUMENTS

2001/0055062 A1 * 12/2001 Shioda et al. .................. 348/79

FOREIGN PATENT DOCUMENTS

| | | |
|---|---|---|
| JP | 61-229489 | 10/1986 |
| JP | 07-038189 | 2/1995 |
| JP | 2000-000538 | 1/2000 |
| JP | 2000-135582 | 5/2000 |
| JP | 2002-196502 | 7/2002 |
| JP | 2003-305582 | 10/2003 |

* cited by examiner

MULTIDIRECTIONAL ELECTROMAGNETIC WAVE IRRADIATION SYSTEM OF WORKPIECE AND LASER MATERIAL PROCESSING SYSTEM EMPLOYING IT

TECHNICAL FIELD

The present invention relates to a system for multidirectional electromagnetic wave irradiation of an object to be processed, a laser machining apparatus and an ultraviolet curing resin bonding apparatus and, more particularly, to a system for multidirectional electromagnetic wave irradiation of an object to be processed, a laser machining apparatus and an ultraviolet curing resin bonding apparatus capable of simultaneously irradiating faces of an object to be processed with electromagnetic waves with high accuracy.

BACKGROUND ART

The need sometimes arises for irradiating an object to be processed with electromagnetic waves in many directions for the purpose of surface working or the like in various industrial fields.

To know the state of filing of applications for patent or the like aimed at simultaneous electromagnetic wave irradiation in many directions, a survey by search in Japan Patent Office Industrial Property Digital Library has been tried as follows.

Menu: Publication text search

Search formula: (six faces+multiple face) *irradiation*simultaneous*working*(electromagnetic wave+light)

Data: Published patent application

Search date: Jan. 4, 2005

Number of hits: 3

In the results of these surveys, those shown as patent documents 1 and 3 below relate to a technique of simultaneously working in a plurality of working regions on one plane, and the one shown as patent document 2 is a technique of attaching shielding members over a multiplicity of surfaces of an object to be processed and simultaneously or successively irradiating the multiplicity of surfaces with a beam.

[Patent document 1]: Japanese Patent Laid-Open No. 10-323785, Laser machining apparatus

[Patent document 2]: Japanese Patent Laid-Open No. 08-318387, Method of processing by energy beam and processing apparatus

[Patent document 3]: Japanese Patent Laid-Open No. 05-008072, Laser machining method

DISCLOSURE OF THE INVENTION

Problems to be Solved by the Invention

However, each of the conventional techniques described above is not a technique of using a simple arrangement for working an object to be processed by simultaneously irradiating faces of the object with electromagnetic waves. For example, in a case where laser machining is to be performed on an arbitrary one or simultaneously on plural ones of a multiplicity of faces of an object, or in a case where bonding is to be performed on an arbitrary one of surfaces of an ultraviolet curing resin member, which is an object to be processed, or to be simultaneously performed in a plurality of places, it is necessary to move the object to be processed or to provide a multiple electromagnetic wave irradiation function. It is troublesome to do so. If a technique of simultaneously irradiating faces of an object to be processed with electromagnetic waves without moving the object is provided, the facility, efficiency and accuracy with which surface working or the like is performed can be improved.

An object of the present invention is to solve the above problem and to provide, as a solution to the above-described problem, a system for multidirectional electromagnetic wave irradiation of an object to be processed, a laser machining apparatus and an ultraviolet curing resin bonding apparatus capable of simultaneously irradiating faces of an object to be processed with electromagnetic waves with high accuracy without moving an object to be processed.

Means for Solving the Problem

The inventor of the present invention made studies about the above-described problem, found that the problem can be solved by using a prism placement method for providing one WD for images from different faces, and achieved the present invention as a result of this finding. That is, the invention claimed or at least disclosed in the present application as means for solving the above-described problem is as described below.

(1) A system for multidirectional electromagnetic wave irradiation of an object to be processed having at least one of one, two or more side face irradiation prism systems capable of irradiating a top face and one, two or more side faces of the object to be processed with electromagnetic waves from one electromagnetic wave generation source without moving the object to be processed, and a bottom face irradiation prism system capable of irradiating a bottom face of the object to be processed with electromagnetic waves without moving the object to be processed, the system for multidirectional electromagnetic wave irradiation being characterized in that each of the side face irradiation prism systems has an optical path direction changing prism or an optical path direction changing prism function; the prism systems are provided by the side of an open space for directly obtaining electromagnetic wave irradiation from the electromagnetic wave generation source so that the open space is secured right above the object to be processed, and so that a portion for mount of the object to be processed is secured; the prism systems are placed so that each of the optical paths through which electromagnetic waves entering the prism system from above travel extends via the optical path direction changing prism or the like to reach sideways the side face of the object to be processed, without being obstructed; and the electromagnetic wave generation source is arranged so as to be able to generate electromagnetic waves from right above the prism system toward the prism system.

(2) A system for multidirectional electromagnetic wave irradiation of an object to be processed having one, two or more side face irradiation prism systems capable of irradiating a top face and one, two or more side faces of the object to be processed with electromagnetic waves from one electromagnetic wave generation source without moving the object to be processed, and a bottom face irradiation prism system capable of irradiating a bottom face of the object to be processed with electromagnetic waves without moving the object to be processed, the system for multidirectional electromagnetic wave irradiation being characterized in that each of the side face irradiation prism systems and the bottom face irradiation prism system has an optical path direction changing prism or an optical path direction changing prism function; each prism systems is provided so as to occupy side spaces around an open space for directly obtaining electromagnetic wave irradiation from the electromagnetic wave generation source and a space at a position partially below the open space such that that the open space is secured right above the object to be processed, and such that a portion for mount of the object to be processed is secured; each prism system is placed so that each of the optical paths through which electromagnetic waves entering the prism system from above travel extends via the optical path direction changing prism or the like to reach sideways the side face or upward the bottom face of the object to be processed, without being obstructed; and the electromagnetic wave generation source is arranged so as to be able to generate electromagnetic waves from right above the prism system toward the prism system.

(3) The system for multidirectional electromagnetic wave irradiation of an object to be processed described in (1) or (2), characterized in that a 45° mirror prism, a penta prism capable of obtaining an erect image or a prism having the corresponding 45° mirror prism function or penta prism function is used as the optical path direction changing prism or the optical path direction changing prism function in the side face irradiation prism system, and a trapezoidal prism or a triangular prism capable of changing the direction two times or a prism having the corresponding trapezoidal prism function or triangular prism function is used as the optical path direction changing prism or the optical path direction changing prism function in the bottom face irradiation prism system.

(4) The system for multidirectional electromagnetic wave irradiation of an object to be processed described in (3), characterized in that the side face irradiation prism system, the bottom face irradiation prism system and the portion for mount of the object to be processed are formed integrally with each other.

(5) The system for multidirectional electromagnetic wave irradiation of an object to be processed described in any one of (1) to (4), characterized in that the electromagnetic wave generation source is provided at a position corresponding to a depth of field sufficient for simultaneously adjusting the in-focus planes with respect to the faces of the object to be processed.

(6) The system for multidirectional electromagnetic wave irradiation of an object to be processed described in (5), characterized in that the electromagnetic wave generation source is arranged so as to be movable to each of positions right above the prism systems.

(7) The system for multidirectional electromagnetic wave irradiation of an object to be processed described in (5) or (6), characterized in that the electromagnetic wave generation source is a machining laser source such as a YAG or $CO_2$ laser source with which the same laser machining can be performed on the plurality of faces of the object to be processed without moving the object to be processed.

(8) A laser machining apparatus using the system for multidirectional electromagnetic wave irradiation of an object to be processed described in (7).

(9) The system for multidirectional electromagnetic wave irradiation of an object to be processed described in (5) or (6), characterized in that the electromagnetic wave generation source is an ultraviolet source with which ultraviolet irradiation can be performed on the plurality of faces of the object to be processed without moving the object to be processed.

(10) An ultraviolet curing resin bonding apparatus using the system for multidirectional electromagnetic wave irradiation of an object to be processed described in (9).

(11) The ultraviolet curing resin bonding apparatus described in (10), characterized in that a masking portion for masking of ultraviolet rays is provided on the ultraviolet source to enable bonding of an arbitrary portion on a ultraviolet curing resin which is the object to be processed.

ADVANTAGES OF THE INVENTION

The system for multidirectional electromagnetic wave irradiation of an object to be processed, the laser machining apparatus and the ultraviolet curing resin bonding apparatus of the present invention are arranged as described above to enable processing such as surface working on the faces of an object to be processed by simultaneously irradiating the faces of the object with electromagnetic waves with accuracy without moving the object to be processed. Thus, the present invention improves the facility, efficiency and accuracy with which such processing is performed.

A further detailed description will be made. The effects described below can be obtained by using the system for multidirectional electromagnetic wave irradiation of an object to be processed, the laser machining apparatus and the ultraviolet curing resin bonding apparatus of the present invention.

(I) The in-focus planes can be simultaneously adjusted in all the six-face directions irrespective of whether the shape of the object to be processed can be substantially grasped as a cubic shape or the shape of rectangular block; a so-called eclipse can be prevented. Therefore, electromagnetic wave irradiation can be performed with accuracy; the time required for surface working or the like can be reduced; the efficiency can be improved; and the cost can be reduced.

(II) Even in a case where an object such as a polyhedral body having seven or more faces including upper and lower faces is to be processed, the number of sets of side face irradiation prism systems is increased to ensure that the in-focus planes are simultaneously adjusted for all the faces, and that an eclipse-free condition can be provided.

(III) Even in a case where an object such as a spherical or hyper-polyhedral body is to be processed, the depth of field of a lens is increased to ensure that the in-focus planes can be adjusted, and that an eclipse-free condition can be provided.

(IV) The 45° mirror prism in the side face irradiation prism system is replaced with a penta prism or the triangular prism is replaced with a pentagonal prism to enable electromagnetic wave irradiation in the erect state.

(V) An additional component for an optical path shifting prism function, such as an optical path shifting prism or optical path shifting plane mirrors, is provided to reduce the area of light incident on the lens. The resolution can be improved in this way.

(VI) A carriage path through which objects to be processed can be moved is provided to enable multidirectional simultaneous electromagnetic wave irradiation of a multiplicity of objects to be processed to be continuously performed.

(VII) A telecentric lens may be used. From the characteristics of the telecentric lens, the size of the prisms can be reduced; the prisms can be placed closer to each other; the overall size can be reduced; and surface working or the like can be performed with accuracy.

DESCRIPTION OF SYMBOLS

Figure 1:
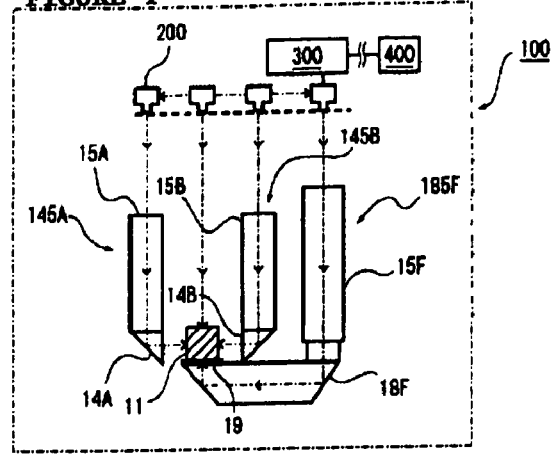
FIG. 1 is an explanatory diagram schematically showing a basic arrangement of a system for multidirectional electromagnetic wave irradiation of an object to be processed in accordance with the present invention.

1*a* to 1*f* . . . Faces of object to be processed
11 . . . Object to be processed
145A, 145B . . . Side face irradiation prism system
14A, 14B . . . Optical path direction changing prism
15A, 15B . . . Optical path length correcting prism
185F . . . Bottom face irradiation prism system
18F . . . Optical path direction changing prism
15F . . . Optical path length correcting prism
19 . . . Portion on which object to be processed is mounted (means for carrying object to be processed, portion for mount of object to be processed)
100 . . . System for multidirectional electromagnetic wave irradiation of object to be processed
200 . . . Electromagnetic wave generation source
300 . . . Drive mechanism
400 . . . Drive control means
40*a*, 40*b*, 40*c*, 40*d* . . . 45° mirror prism
41*a* to 41*d* . . . Optical path direction changing prism (triangular mirror prism)
50*a* to 50*f* . . . Optical path length correcting prism
8*a* . . . Optical path direction changing prism (trapezoidal prism)
9 . . . Means for carrying object to be processed (portion for mount of object to be processed)
245 . . . Side face irradiation prism system
24 . . . Optical path direction changing prism
25 . . . Optical path length correcting prism
285F . . . Bottom face irradiation prism system
28F . . . Optical path direction changing prism
25F . . . Optical path length correcting prism
2145A, 2145B . . . Side face irradiation prism system
214A, 214B . . . Optical path direction changing prism
215A, 215B . . . Optical path length correcting prism
219 . . . Portion for mount of object to be processed
385F . . . Bottom face irradiation prism system
35 . . . Optical path length correcting prism
38F . . . Optical path direction changing prism
39 . . . Portion for mount of object to be processed
845A . . . Side face irradiation prism system
84A . . . Optical path direction changing prism
85A . . . Optical path length correcting prism
89 . . . Portion for mount of object to be processed
64A, 64B . . . Optical path direction changing prism
65A, 65B . . . Optical path length correcting prism
68F . . . Optical path direction changing prism
65F . . . Optical path length correcting prism
69 . . . Portion for mount of object to be processed
631, 632 . . . Supporting structure portion

BEST MODE FOR CARRYING OUT THE INVENTION

The present invention will be described below in detail with reference to the drawings. In some cases in the following description, elements having basically the same functions are indicated by the same reference characters throughout drawings.

FIG. 1 is an explanatory diagram schematically showing a basic arrangement of a system for multidirectional electromagnetic wave irradiation of an object to be processed in accordance with the present invention.

Figure 8:
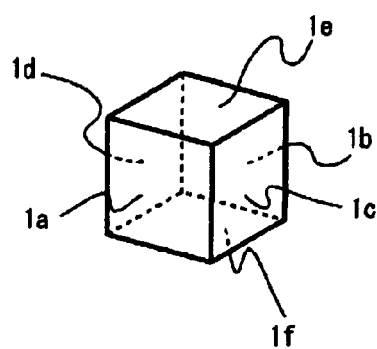
FIG. 8 is a perspective explanatory diagram showing a model for an object to be processed, used for the description of the present invention.

FIG. 8 is a perspective explanatory diagram showing a model for an object to be processed, used below for the description of the present invention.

Referring to FIG. 1, the system 100 for multidirectional electromagnetic wave irradiation of an object to be processed has at least one of one, two or more side face irradiation prism systems 145A, 145B and soon capable of irradiating a top face and one, two or more side faces of an object 11 to be processed with electromagnetic waves from one electromagnetic wave generation source 200 without moving the object 11 to be processed, and a bottom face irradiation prism system 185F capable of irradiating a bottom face of the object 11 to be processed with electromagnetic waves without moving the object 11 to be processed. Each of the side face irradiation prism system 145A and so on has an optical path direction changing prism 14A or the like or an optical path direction changing prism function. An essential arrangement is provided in which the prism system 145A and so on are provided by the side of an open space for directly obtaining electromagnetic wave irradiation from the electromagnetic wave generation source 200 so that the open space is secured right above the object 11 to be processed, and so that a portion 19 for mount of the object 11 to be processed is secured; the prism system 145A and so on are also placed so that each of the optical paths from the prism system 145A and so on, through which electromagnetic waves entering the prism system from above travel, extends via the optical path direction changing prism 14A or the like to reach sideways the side face of the object 11 to be processed, without being obstructed; and the electromagnetic wave generation source 200 is arranged so as to be able to generate electromagnetic waves from right above each of the prism system 145A and so on toward the prism system.

The system for multidirectional electromagnetic wave irradiation of an object to be processed may include both the side face irradiation prism system 145A and so on and the bottom face irradiation prism system 185F or one of the side face irradiation prism system 145A and so on and the bottom face irradiation prism system 185F as described below, as shown in the figure.

The electromagnetic wave generation source 200 may have a drive mechanism 300 provided right above the prism system 145A and so on to freely move the electromagnetic wave generation source 200. A control means 400 such as an electronic computer may be used to operate the drive mechanism 300, as shown in the figure.

Reference numerals 19 in the figure denote a portion on which the object 11 to be processed is mounted. As this portion, a means for carrying the object to be processed may be provided, as described below.

In the thus-arranged system 100 for multidirectional electromagnetic wave irradiation of an object to be processed, the electromagnetic wave generation source 200 is positioned right above the prism system 145A and so on and electromagnetic waves are radiated from the electromagnetic wave generation source 200 to the prism system 145A and so on and pass through the prism system 145A and so on, with the optical path direction changed in the prism system 145A and so on. One, two or more side faces 1$a$ and so on or a bottom face 1$f$ of the object 11 to be processed is then irradiated with the electromagnetic waves. Also, the electromagnetic wave generation source 200 is positioned right above the object 11 to be processed and electromagnetic waves are radiated from the electromagnetic wave generation source 200 to a top face 1$e$ of the object 11 to be processed.

The electromagnetic wave generation source 200 is freely movably arranged at the position right above the prism systems 145A, 185F and so on and at the position right above the object 11 to be processed. Therefore the desired face 1$a$ and so on of the object 11 to be processed can be irradiated with electromagnetic waves from the electromagnetic wave generation source 200 according to the prism system arrangement in the electromagnetic wave irradiation system 100 without moving or rotating the object 11 to be processed. Referring to FIG. 1, the plurality of side faces, the bottom face and the top face can be irradiated with electromagnetic waves.

The optical path direction changing prism 14A or the like provided in each of the side face irradiation prism system 145A and so on and the bottom face irradiation prism system 185F changes the direction of the optical path through which light entering the prism system from the electromagnetic wave generation source 200 travels so that the optical path extends toward the predetermined face of the object 11 to be processed. Electromagnetic waves are radiated to the top face of the object 11 to be processed through the open space secured right above the object without being passed through any particular prism system.

The prisms systems 145A, 185F, and so on occupy side spaces around the open space and a space at a position partially below the open space, so that the space portion for mounting the object 11 to be processed is secured.

The provision and arrangement of the prism systems 145A, 185F, and soon ensure that the path for electromagnetic waves in the prism system extends downward with respect to the object 11 to be processed and toward the predetermined face without being obstructed by any of the other prism systems, and that each face is irradiated with the electromagnetic waves.

As shown in FIG. 1, the above-described side face irradiation prism system 145A and so on and the bottom face irradiation prism system 185F in the system 100 for multidirectional electromagnetic wave irradiation of an object to be processed in accordance with the present invention are respectively provided with optical path length correcting prisms 15A, 15B, 15F, and so on or a functionally corresponding optical path length correcting prism function (hereinafter also referred to collectively as "optical path length correcting prism") above the optical path direction changing prisms 14A or the like in addition to the above-described arrangement. The optical path length correcting prisms 15A, 15B, 15F, and so on are provided for the purpose of equalizing the WDs of the faces of the object 11 to be processed other than the top face of the same to the WD of the top face.

This arrangement ensures that in the system for multidirectional electromagnetic wave irradiation of an object to be processed the WDs of the faces other than the top face of the object 11 to be processed are corrected by the optical path length correcting prisms 15A, 15B, 15F, and so on so as to be equal to the WD of the top face. That is, the WDs are equalized by this correction with respect to electromagnetic wave irradiation to the faces and electromagnetic wave irradiation is performed in a state where the in-focus planes are adjusted.

The optical path length correcting prisms 15A, 15B, 15F, and so on may be changed as desired to enable optical path length correction according to the shape and size of the object to be processed. An arrangement for forming optical paths so that the optical path lengths can be adjusted by using some other suitable means may alternatively be adopted.

Figure 2:
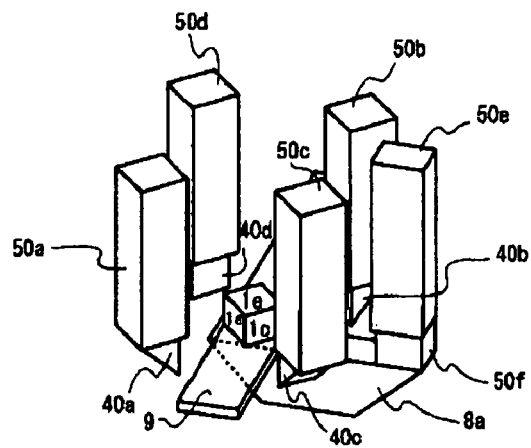
FIG. 2 is an explanatory perspective view showing an example of arrangement of a prism system in a system capable of six-direction irradiation included in the systems for multidirectional electromagnetic wave irradiation of an object to be processed in accordance with the present invention.

FIG. 2 is an explanatory perspective view showing an example of arrangement of a prism system capable of six-direction irradiation in the system for multidirectional electromagnetic wave irradiation of an object to be processed in accordance with the present invention. Referring to the figure, the system for multidirectional electromagnetic wave irradiation of an object to be processed can use 45° mirror prisms 40$a$, 40$b$, 40$c$, and 40$d$ or prisms having the corresponding function (hereinafter also referred to collectively as "45° mirror prism") in the side face irradiation prism systems, and a trapezoidal prism 8$a$ or a triangular prism capable of changing the direction two times or a prism having the corresponding function (hereinafter also referred to correctively as "trapezoidal prism) in the bottom face irradiation prism system.

The arrangement shown in these figures is only an example of an arrangement capable of irradiating the six faces of a six-face object to be processed, including a cube, with electromagnetic waves without moving the object. The present invention is not limited to this number of faces. In these figures, reference symbols 50$a$, 50$b$, . . . , 50$f$ denote optical path length correcting prisms.

A further description will be made of electromagnetic wave irradiation of side and top faces of an object to be processed in the system for multidirectional electromagnetic wave irradiation of an object to be processed. The focal length in the case of travel of electromagnetic waves including light in glass is increased relative to the focal point in the case of travel in air according to the refractive index. Accordingly, the WD from the side face 1$a$ of the object to be processed to the electromagnetic wave generation source end surface and the WD from the top face 1$e$ of the object to be processed to the electromagnetic wave generation source end surface differ from each other.

The optical path length correcting prism 50$a$ is placed in the optical path from the side face 1$a$ of the object to be processed to the electromagnetic wave generation source with the longer distance to equalize the two distances in terms of optical path length in air, thereby enabling the in-focus planes for the side face 1$a$ and the top face 1$e$ in the faces of the object to be processed to coincide with each other.

The WDs of the side faces 1a and 1b in the faces of the object to be processed have distance values equal to each other. Therefore, the optical path length correcting prisms 50a and 50b in accordance with the same specification may be disposed for electromagnetic wave irradiation uniform in effect on the faces of the object to be processed. The optical path length correcting prisms 50a, 50b, 50c, and 50d may be arranged on the basis of the common specification according to the same principle to equalize the electromagnetic wave irradiation effects thereon for the side faces in four directions of the object to be processed.

The use of the 45° mirror prisms 40a, 40b, 40c, and 40d ensures that the size of the optical path length correcting prisms 50a, 50b, and so on can be reduced.

As illustrated in FIG. 2, a means 9 for carrying an object to be processed may be placed below the object to be processed in the system for multidirectional electromagnetic wave irradiation of an object to be processed in order to hold the object to be processed and to enable the same to be moved. The means 9 for carrying an object to be processed may be formed by using a transparent material such as glass to enable a bottom face image of the object to be obtained therethrough. If glass is used, the means for carrying the object to be processed will be referred to as "object carrying glass plate" as occasion demands. The object carrying glass plate 9 on which a plurality of objects to be processed are mounted may be moved in its longitudinal direction by a suitable means to enable the plurality of objects to be processed to be continuously irradiated with electromagnetic waves with efficiency.

A further description will be made of obtaining top face and bottom face (lower face) images of an object to be processed in the system for multidirectional electromagnetic wave irradiation of an object to be processed in accordance with the present invention.

The trapezoidal prism (or triangular prism) 8a having two reflecting surfaces is placed below the objected to be processed and the object carrying glass plate 9 to bend the optical path toward a lens 5 by reflecting the optical path two times.

The optical path length correcting prisms 50f and 50e and the trapezoidal prism (or triangular prism) 8a having two reflecting surfaces are placed so that the distances of the WD from the lower face 1f of the object to be processed to the electromagnetic wave generation source end surface and the WD from the upper face 1e of the object to be processed to the electromagnetic wave generation source end surface are equal to each other in terms of optical path length in air, as are those in the above-described case of the side faces of the object to be processed. The in-focus planes with respect to the object to be processed are thereby made to coincide with each other to achieve electromagnetic wave irradiation uniform in effect on the faces of the object to be processed, thus equalizing the electromagnetic wave radiation effects on the faces.

Referring to these figures, the above-described space (9) for carrying the object to be processed can be secured by adjusting the distance between the optical path length correcting prisms 50a and 50b and the distance between the optical path length correcting prisms 50d and 50c.

Figure 3:
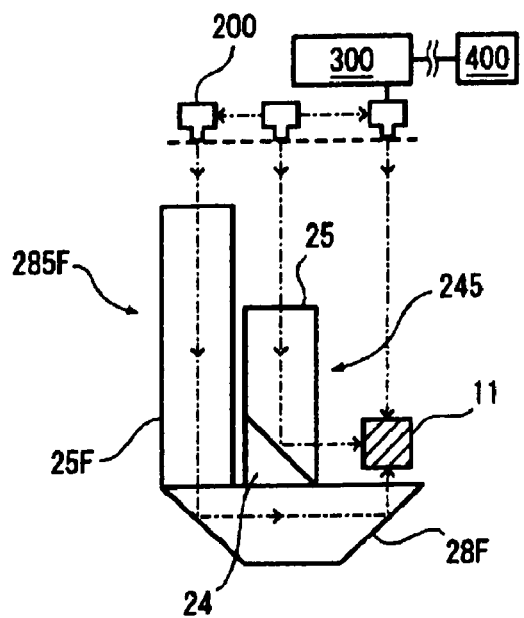
FIG. 3 is an explanatory diagram showing an example of arrangement of the system for multidirectional electromagnetic wave irradiation of an object to be processed in accordance with the present invention.

FIG. 3 is an explanatory diagram showing a basic arrangement of a system for multidirectional electromagnetic wave irradiation of an object to be processed capable of irradiating only a top face, a bottom face and one side face with electromagnetic waves. If electromagnetic wave irradiation in three directions suffices, an arrangement simpler than the example of the arrangement shown in FIGS. 1 and 2 may suffice.

Figure 4:
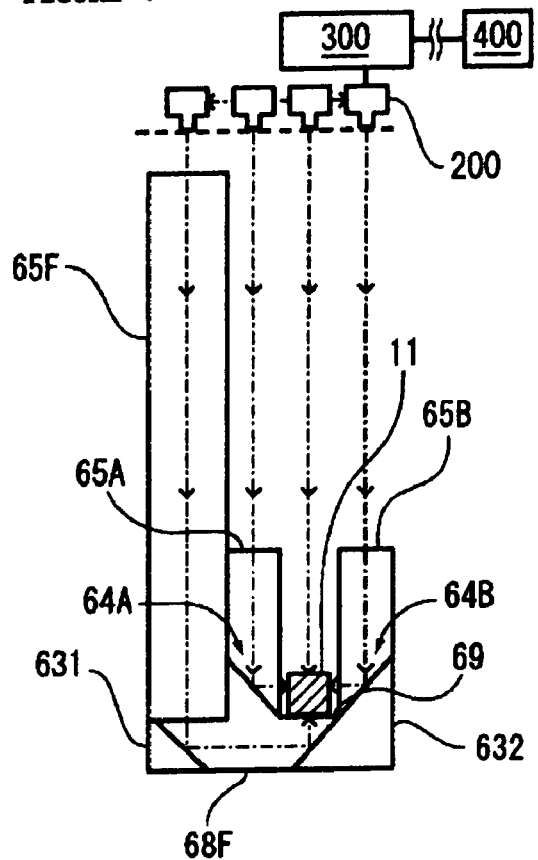
FIG. 4 is an explanatory diagram showing an example of arrangement of the system for multidirectional electromagnetic wave irradiation of an object to be processed in accordance with the present invention.

FIG. 4 is an explanatory diagram showing an example of arrangement of a system for multidirectional electromagnetic wave irradiation of an object to be processed in which side face irradiation prism systems, a bottom face irradiation prism system and a portion for mount of an object to be processed are formed integrally with each other. The integral formation ensures easier handling in installation, movement, etc.

Figure 5:
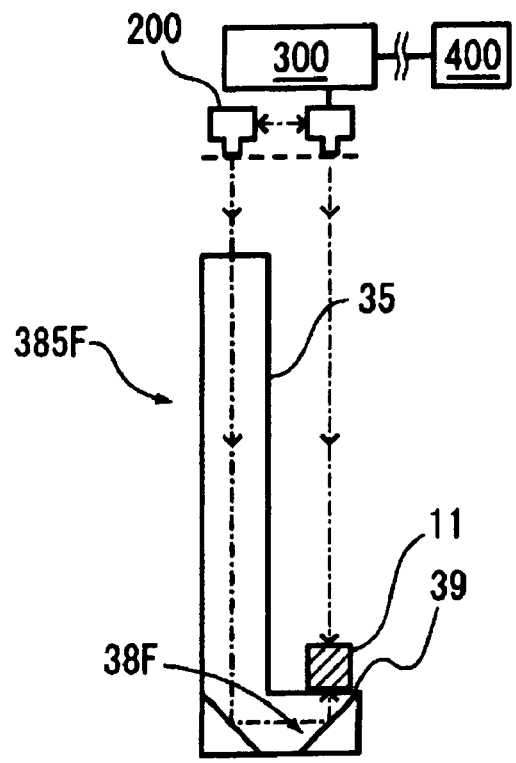
FIG. 5 is an explanatory diagram showing an example of arrangement of the system for multidirectional electromagnetic wave irradiation of an object to be processed in accordance with the present invention.

FIG. 5 is an explanatory diagram showing an example of arrangement of an electromagnetic wave irradiation system specific for bottom face irradiation in the system for multidirectional electromagnetic wave irradiation of an object to be processed in accordance with the present invention. The present invention is a system for multidirectional electromagnetic wave irradiation of an object to be processed having at least one of one, two or more side face irradiation prism systems for irradiating one, two or more side faces of the object to be processed with electromagnetic waves and a bottom face irradiation prism system for irradiating a bottom face with electromagnetic waves, as described above. Therefore, the electromagnetic wave irradiation system specific for bottom face irradiation, which is basically constituted by an optical path length correcting prism 35 and an optical path direction changing prism or an optical path direction changing prism function portion 38F, as shown in these figures, and an electromagnetic wave irradiation system specific for side face irradiation as described below are also within the scope of the present invention. In the electromagnetic wave irradiation system specific for bottom face irradiation, electromagnetic waves are radiated from the prism system only to the bottom face of the object 11 to be processed. Electromagnetic wave irradiation in two or more directions, i.e., irradiation to the bottom face and irradiation to the top face from above the portion 39 for mount of the object to be processed, is achieved. This electromagnetic wave irradiation system specific for bottom face irradiation is a necessary and sufficient arrangement in a case where electromagnetic wave irradiation of a bottom face is required but there is no need for electromagnetic wave irradiation of side faces.

Figure 6:
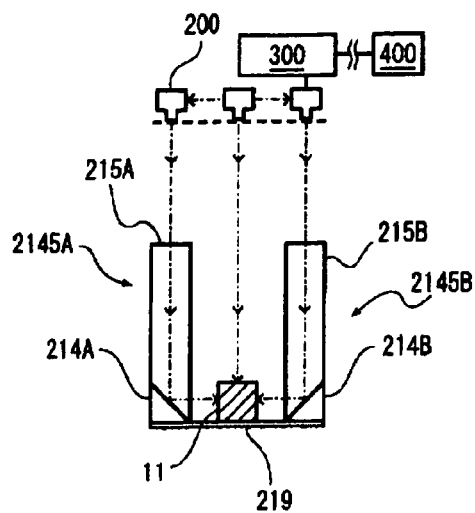
FIG. 6 is an explanatory diagram showing an example of arrangement of the system for multidirectional electromagnetic wave irradiation of an object to be processed in accordance with the present invention.

FIG. 6 is an explanatory diagram showing an example of arrangement of an electromagnetic wave irradiation system specific for side face irradiation in the systems for multidirectional electromagnetic wave irradiation of an object to be processed in accordance with the present invention. In the electromagnetic wave irradiation system specific for side face irradiation, electromagnetic waves are radiated from the prism systems only to the side faces of the object 11 to be processed. Electromagnetic wave irradiation in two or more directions, i.e., irradiation to the side faces and irradiation to the top face from above the portion 39 for mount of the object to be processed, is achieved. This electromagnetic wave irradiation system specific for side face irradiation is a necessary and sufficient arrangement in a case where electromagnetic wave irradiation of a side face is required but there is no need for electromagnetic wave irradiation of a bottom face.

In the system for multidirectional electromagnetic wave irradiation of an object to be processed in accordance with the present invention, the number of side face irradiation prism systems constituting the irradiation system is not limited to a particular number. For example, the number of prism systems may be one of 2, 3, 4, 5, 6 and 7. However, the number of prism systems may be 8 or larger.

Figure 7:
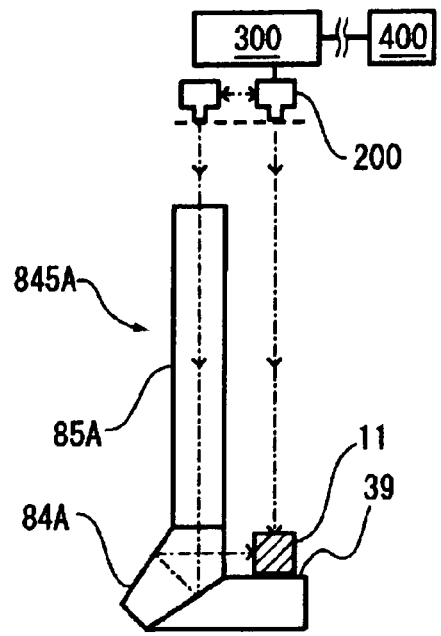
FIG. 7 is an explanatory diagram showing an example of arrangement of the system for multidirectional electromagnetic wave irradiation of an object to be processed in accordance with the present invention.

FIG. 7 is an explanatory diagram showing an example of use of a penta prism in aside face irradiation prism system 845A in the system for multidirectional electromagnetic wave irradiation of an object to be processed in accordance with the present invention. In the figure, an example of arrangement of an electromagnetic wave irradiation system specific for side face irradiation is illustrated. As shown in the figure, a penta prism capable of obtaining an erect image or a prism having the corresponding function (hereinafter also referred to collectively as "penta prism") can be used as the optical path direction changing prism and so on 84A of the side face irradiation prism system in the system for multidirectional electromagnetic wave irradiation of an object to be processed.

"Penta prism" refers to one of pentagonal prisms, particularly a pentagonal prism capable of reflecting an image by bending a beam of incident light through 90° by reflecting the incident light two times in the prism while maintaining the image in the erect state without image inversion. The use of such a penta prism ensures that electromagnetic wave irradiation of the faces of the object 11 to be processed can be performed while maintaining the erect-image relationship with the electromagnetic waves from electromagnetic wave generation source 200.

The penta prism or the like is used as an optical path direction changing prism in place of the 45° mirror prism or the like. In the mirror prism or the like, 90° bending reflection is caused when reflection by a mirror reflecting surface is performed one time. Each image reflected one time and four images reflected two times differ in orientation from each other. Therefore, if the 45° mirror prism or the like is replaced with the penta prism or the like, the image of each side face of the object to be processed can be reflected two times, as is the image of the lower face. As a result, electromagnetic wave irradiation of all the faces of the object 11 to be processed can be performed while maintaining the erect-image relationship with electromagnetic waves from the electromagnetic wave generation source 200.

In each of the prism systems in the system for multidirectional electromagnetic wave irradiation of an object to be processed as illustrated in the figures, an optical path shifting prism or an optical path shifting prism function for shifting an optical path (hereinafter also referred to collectively as "optical path shifting prism") may be provided above the optical path direction changing prism 14A and so on or the optical path length correcting prism 15A and so on. "Shifting" refers to a movement along a direction in a section transversal to the direction of travel of electromagnetic waves to the optical path length correcting prism 15A and so on.

If the optical path shifting prism is provided, the range of movement of the electromagnetic wave generation source 200 for supplying electromagnetic waves to the faces of the object to be processed can be reduced.

As shown in FIG. 2, the means 9 for carrying the object to be processed on which two or more objects to be processed are mounted and which is capable of carrying and moving the objects can be provided in the system for multidirectional electromagnetic wave irradiation of an object to be processed according to the present invention, and the above-described prism systems 50a, 50e, and so on can be arranged by being placed so that the carriage path for the means 9 for carrying the object to be processed is secured.

Various shape of objects to be processed may exist. The description has been made mainly of the cubic shape shown in FIG. 8 as a model for the object to be processed. In a case where the object to be processed has the shape of a rectangular block having sides of different lengths, or a shape similar to the shape of such a rectangular block, the size of the optical path length correcting prism 15A and so on may be changed to a suitable value to enable all the faces of the object to be processed to be irradiated with electromagnetic waves while being simultaneously focused.

In a case where an object in the form of a shaped polyhedral body having parallel upper and lower faces and five or more side faces for example is to be processed, the system may be modified by increasing the number of sets of side-face optical path length correcting prism 15A and so on and optical path direction changing prism 14A and so on in correspondence with the number of side faces.

Even in a case where the object to be processed has one, two or more of such kinds of complicatedness of shapes, the system may be modified by selecting a suitable combination of a) the method of changing the size of the optical path length correcting prism to a suitable value, b) the method of increasing the number of sets of optical path length correcting prisms and optical path direction changing prisms in correspondence with the number of side faces, and c) the method of arranging the electromagnetic wave generation source so that the depth of field is sufficiently increased, or selecting one of these methods.

A mechanism such as an XY table or a linear guide may optionally be used as the drive mechanism 300 to move the electromagnetic wave generation source 200 to each of the positions right above the prism system 145A and so on, as shown in the figures.

In the system for multidirectional electromagnetic wave irradiation of an object to be processed, a machining laser source such as a YAG or $CO_2$ laser source may be provided as the electromagnetic wave generation source to form a laser machining apparatus capable of performing the same laser machining on a plurality of faces of an object to be processed without moving the object to be processed.

Similarly, an ultraviolet source may be provided as the electromagnetic wave generation source to form an ultraviolet curing resin bonding apparatus capable of irradiating a plurality of faces of an object to be processed with ultraviolet rays without moving the object to be processed.

In such a case, a masking portion for masking of ultraviolet rays may be provided on the ultraviolet source of the ultraviolet curing resin bonding apparatus to enable bonding of an arbitrary portion on a ultraviolet curing resin which is an object to be processed.

INDUSTRIAL APPLICABILITY

The system for multidirectional electromagnetic wave irradiation of an object to be processed, the laser machining apparatus and the ultraviolet curing resin bonding apparatus of the present invention are arranged as described above to enable processing such as surface working on the faces of an object to be processed by simultaneously irradiating the faces of the object with electromagnetic waves with accuracy without moving the object to be processed. Thus, the present invention improves the facility, efficiency and accuracy with which such processing is performed and has an extremely high industrial usage value.

The invention claimed is:

1. A system for multidirectional electromagnetic wave irradiation of an object to be processed having at least one of one, two or more side face irradiation prism systems capable of irradiating a top face and one, two or more side faces of the object to be processed with electromagnetic waves from one electromagnetic wave generation source without moving the object to be processed, and a bottom face irradiation prism system capable of irradiating a bottom face of the object to be processed with electromagnetic waves without moving the object to be processed, the system for multidirectional electromagnetic wave irradiation being characterized in that each of the side face irradiation prism systems has an optical path direction changing prism or an optical path direction changing prism function; the prism systems are provided by the side of an open space for directly obtaining electromagnetic wave irradiation from the electromagnetic wave generation source so that the open space is secured right above the object to be processed, and so that a portion for mount of the object to be processed is secured; the prism systems are placed so that each of the optical paths through which electromagnetic waves entering the prism system from above travel extends via the optical path direction changing prism or the like to reach sideways the side face of the object to be processed, without being obstructed; and the electromagnetic wave generation source is arranged so as to be able to generate electromagnetic waves from right above the prism system toward the prism system.

2. The system for multidirectional electromagnetic wave irradiation of an object to be processed according to claim 1, characterized in that a 45° mirror prism, a penta prism capable of obtaining an erect image or a prism having the corresponding 45° mirror prism function or penta prism function is used as the optical path direction changing prism or the optical path direction changing prism function in the side face irradiation prism system, and a trapezoidal prism or a triangular prism capable of changing the direction two times or a prism having the corresponding trapezoidal prism function or triangular prism function is used as the optical path direction changing prism or the optical path direction changing prism function in the bottom face irradiation prism system.

3. The system for multidirectional electromagnetic wave irradiation of an object to be processed according to claim 2, characterized in that the side face irradiation prism system, the bottom face irradiation prism system and the portion for mount of the object to be processed are formed integrally with each other.

4. The system for multidirectional electromagnetic wave irradiation of an object to be processed according to claim 3 characterized in that the electromagnetic wave generation source is provided at a position corresponding to a depth of field sufficient for simultaneously adjusting the in-focus planes with respect to the faces of the object to be processed.

5. The system for multidirectional electromagnetic wave irradiation of an object to be processed according to claim 2 characterized in that the electromagnetic wave generation source is provided at a position corresponding to a depth of field sufficient for simultaneously adjusting the in-focus planes with respect to the faces of the object to be processed.

6. The system for multidirectional electromagnetic wave irradiation of an object to be processed according to claim 1, characterized in that the electromagnetic wave generation source is provided at a position corresponding to a depth of field sufficient for simultaneously adjusting the in-focus planes with respect to the faces of the object to be processed.

7. The system for multidirectional electromagnetic wave irradiation of an object to be processed according to claim 6, characterized in that the electromagnetic wave generation source is arranged so as to be movable to each of positions right above the prism systems.

8. A system for multidirectional electromagnetic wave irradiation of an object to be processed according to claim 7, characterized in that the electromagnetic wave generation source is a machining laser source such as a YAG or $CO_2$ laser source with which the same laser machining can be performed on the plurality of faces of the object to be processed without moving the object to be processed.

9. The system for multidirectional electromagnetic wave irradiation of an object to be processed according to claim 7, characterized in that the electromagnetic wave generation source is an ultraviolet source with which ultraviolet irradiation can be performed on the plurality of faces of the object to be processed without moving the object to be processed.

10. The system for multidirectional electromagnetic wave irradiation of an object to be processed according to claim 6, characterized in that the electromagnetic wave generation source is a machining laser source such as a YAG or $CO_2$ laser source with which the same laser machining can be performed on the plurality of faces of the object to be processed without moving the object to be processed.

11. A laser machining apparatus using the system for multidirectional electromagnetic wave irradiation of an object to be processed according to claim 10.

12. The system for multidirectional electromagnetic wave irradiation of an object to be processed according to claim 6, characterized in that the electromagnetic wave generation source is an ultraviolet source with which ultraviolet irradiation can be performed on the plurality of faces of the object to be processed without moving the object to be processed.

13. An ultraviolet curing resin bonding apparatus using the system for multidirectional electromagnetic wave irradiation of an object to be processed according to claim 12.

14. The ultraviolet curing resin bonding apparatus according to claim 13, characterized in that a masking portion for masking of ultraviolet rays is provided on the ultraviolet source to enable bonding of an arbitrary portion on a ultraviolet curing resin which is the object to be processed.

15. A system for multidirectional electromagnetic wave irradiation of an object to be processed having one, two or more side face irradiation prism systems capable of irradiating a top face and one, two or more side faces of the object to be processed with electromagnetic waves from one electromagnetic wave generation source without moving the object to be processed, and a bottom face irradiation prism system capable of irradiating a bottom face of the object to be processed with electromagnetic waves without moving the object to be processed, the system for multidirectional electromagnetic wave irradiation being characterized in that each of the side face irradiation prism systems and the bottom face irradiation prism system has an optical path direction changing prism or an optical path direction changing prism function; each prism system is provided so as to occupy side spaces around an open space for directly obtaining electromagnetic wave irradiation from the electromagnetic wave generation source and a space at a position partially below the open space such that that the open space is secured right above the object to be processed, and such that a portion for mount of the object to be processed is secured; each prism system is placed so that each of the optical paths through which electromagnetic waves entering the prism system from above travel extends via the optical path direction changing prism or the like to reach sideways the side face or upward the bottom face of the object to be processed, without being obstructed; and the electromagnetic wave generation source is arranged so as to be able to generate electromagnetic waves from right above the prism system toward the prism system.

16. The system for multidirectional electromagnetic wave irradiation of an object to be processed according to claim 15, characterized in that a 45° mirror prism, a penta prism capable of obtaining an erect image or a prism having the corresponding 45° mirror prism function or penta prism function is used as the optical path direction changing prism or the optical path direction changing prism function in the side face irradiation prism system, and a trapezoidal prism or a triangular prism capable of changing the direction two times or a prism having the corresponding trapezoidal prism function or triangular prism function is used as the optical path direction changing prism or the optical path direction changing prism function in the bottom face irradiation prism system.

17. The system for multidirectional electromagnetic wave irradiation of an object to be processed according to claim 15 characterized in that the electromagnetic wave generation source is provided at a position corresponding to a depth of field sufficient for simultaneously adjusting the in-focus planes with respect to the faces of the object to be processed.

* * * * *